(12) United States Patent  (10) Patent No.: US 8,844,993 B1
Engerman  (45) Date of Patent: Sep. 30, 2014

(54) REINFORCED VEHICLE TRIM ASSEMBLY (71) Applicant: Nissan North America, Inc., Franklin, TN (US)

(72) Inventor: Eric Engerman, Northville, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/017,568

(22) Filed: Sep. 4, 2013

(51) Int. Cl.
 *B60R 13/02* (2006.01)
(52) U.S. Cl.
 CPC .................................. *B60R 13/02* (2013.01)
 USPC ...................................... 296/1.08; 296/37.16
(58) Field of Classification Search
 USPC .................. 296/1.08, 24.3, 37.1, 37.16, 39.1, 296/181.3, 187.05, 191, 193.01
 See application file for complete search history.

(56) References Cited

U.S. PATENT DOCUMENTS

| 4,673,207 A | 6/1987 | Reynolds et al. |
| 7,364,224 B2 | 4/2008 | Wozniak |
| 8,414,046 B2 | 4/2013 | Pencak et al. |
| 8,505,993 B2 * | 8/2013 | Hajiri et al. ............... 296/1.08 |
| 2010/0007175 A1 * | 1/2010 | Mayer et al. ............. 296/190.01 |
| 2011/0068596 A1 * | 3/2011 | Someschan et al. ......... 296/1.08 |
| 2012/0001445 A1 * | 1/2012 | Hajiri et al. ................. 296/1.08 |

FOREIGN PATENT DOCUMENTS

| JP | 58036737 A | * | 3/1983 |
| JP | 2005-096660 A | | 4/2005 |
| JP | 2013212812 A | * | 10/2013 |

* cited by examiner

*Primary Examiner* — Glenn Dayoan
*Assistant Examiner* — Jason S Daniels
(74) *Attorney, Agent, or Firm* — Global IP Counselors, LLP (57) ABSTRACT

A reinforced vehicle trim assembly includes a trim panel and a reinforcement member. The trim panel is mounted to a vehicle body member inside a vehicle storage compartment such that a trim panel free edge extends cantilevered toward a vehicle body panel surface that faces inside the vehicle storage compartment. The reinforcement member is mounted in the vehicle storage compartment proximate to the trim panel between the trim panel and the vehicle body member, and has a reinforcement member free edge that extends cantilevered toward the vehicle body panel surface. The trim panel and the reinforcement member are spaced at first and second distances, respectively, from the vehicle body panel surface and configured to deflect in response to a force applied to the trim panel such that the trim panel free edge and the reinforcement member free edge move toward the vehicle body panel surface.

20 Claims, 12 Drawing Sheets

REINFORCED VEHICLE TRIM ASSEMBLY

BACKGROUND

1. Field of the Invention

The present invention generally relates to a reinforced vehicle trim assembly. More specifically, the present invention relates to a reinforced vehicle trim assembly that is positioned in a storage compartment of a vehicle and configured to maintain desirable structural durability and appearance during application of a loading force on the vehicle trim assembly.

2. Background Information

All types of vehicles, such as automobiles, trucks, vans, SUVs and so on, include various types of interior and exterior trim assemblies. These trim assemblies are configured to fixedly or removably attach to a body component of the vehicle to, for example, cover vehicle components while forming a portion of the exterior or interior surfaces of the vehicle. For instance, in the vehicle passenger compartment, trim assemblies can cover airbags which are stored in pillars or sections of the vehicle dashboard. In storage areas such as the trunk, trim assemblies can cover components such as vehicle wiring, HVAC conduits, spare tires, and so on to hide these components from view while providing a desirable appearance.

However, trim assemblies in storage compartments are particularly susceptible to damage and disengagement from the vehicle body due to loading forces that are often applied to the trim assemblies. For example, in the trunks or large storage spaces of vehicles, large and heavy items such as suitcases, boxes and so on often come into contact with the trim assemblies. These loading forces can cause the trim assemblies to become fully or partially disengaged from the vehicle body, resulting in an undesirable appearance while also risking exposure of and damage to the covered components.

SUMMARY

Accordingly, it is desirable for a vehicle trim assembly positioned in a storage compartment of a vehicle to remain secured to the vehicle body and effectively cover the vehicle components while maintaining an attractive appearance during application of a loading force on the vehicle trim assembly.

In view of the state of the known technology, one aspect of a reinforced vehicle trim assembly includes a trim panel and a reinforcement member. The trim panel is mounted to a vehicle body member inside a vehicle storage compartment such that a trim panel free edge extends cantilevered toward a surface of a vehicle body panel that faces inside the vehicle storage compartment. The trim panel free edge is spaced at a first distance from the surface of the vehicle body panel. The reinforcement member is mounted in the vehicle storage compartment proximate to the trim panel between the trim panel and the vehicle body member. The reinforcement member has a reinforcement member free edge that extends cantilevered toward the surface of the vehicle body panel and is spaced at a second distance from the surface of the vehicle body panel. The trim panel and the reinforcement member are configured to deflect in response to a force applied to the trim panel such that the trim panel free edge and the reinforcement member free edge move toward the surface of the vehicle body panel.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
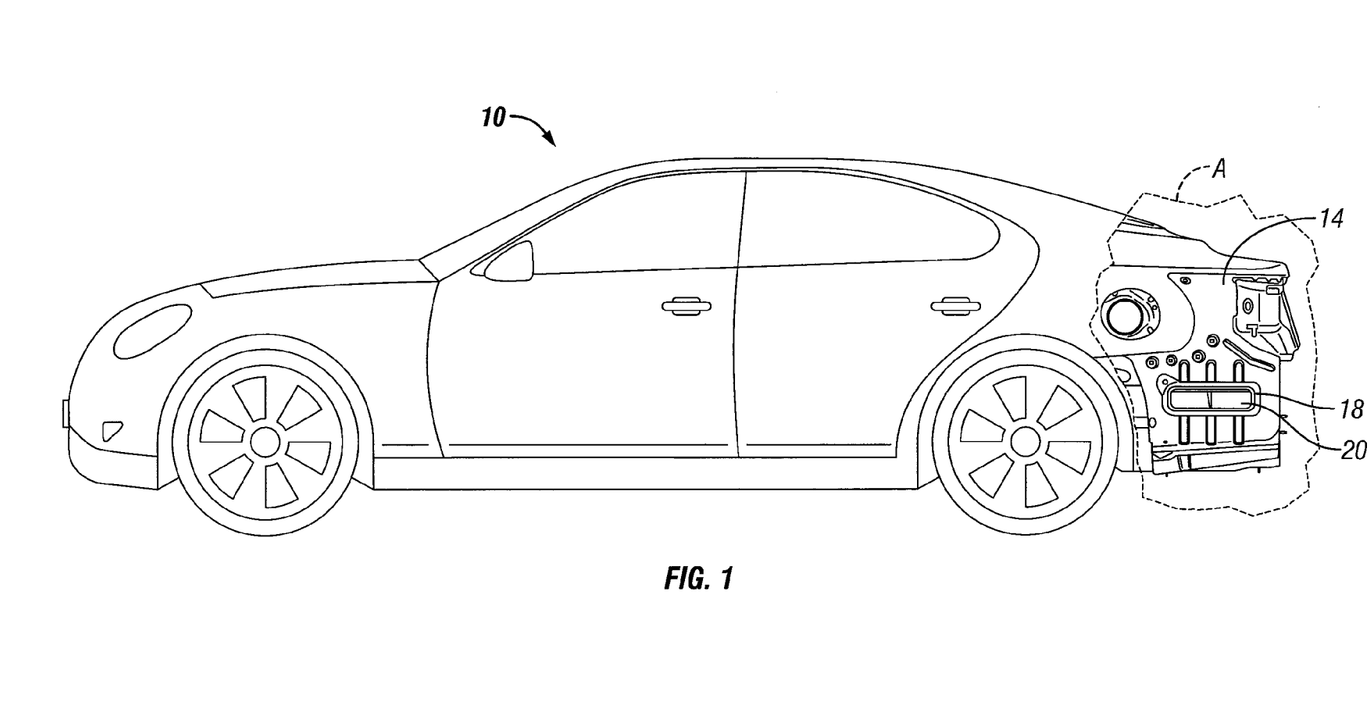
FIG. 1 is a side view of a vehicle including a reinforced vehicle trim assembly according to a disclosed embodiment, with the rear portion of the vehicle being cut away to expose an exterior side of the trunk storage compartment of the vehicle.
Figure 2:
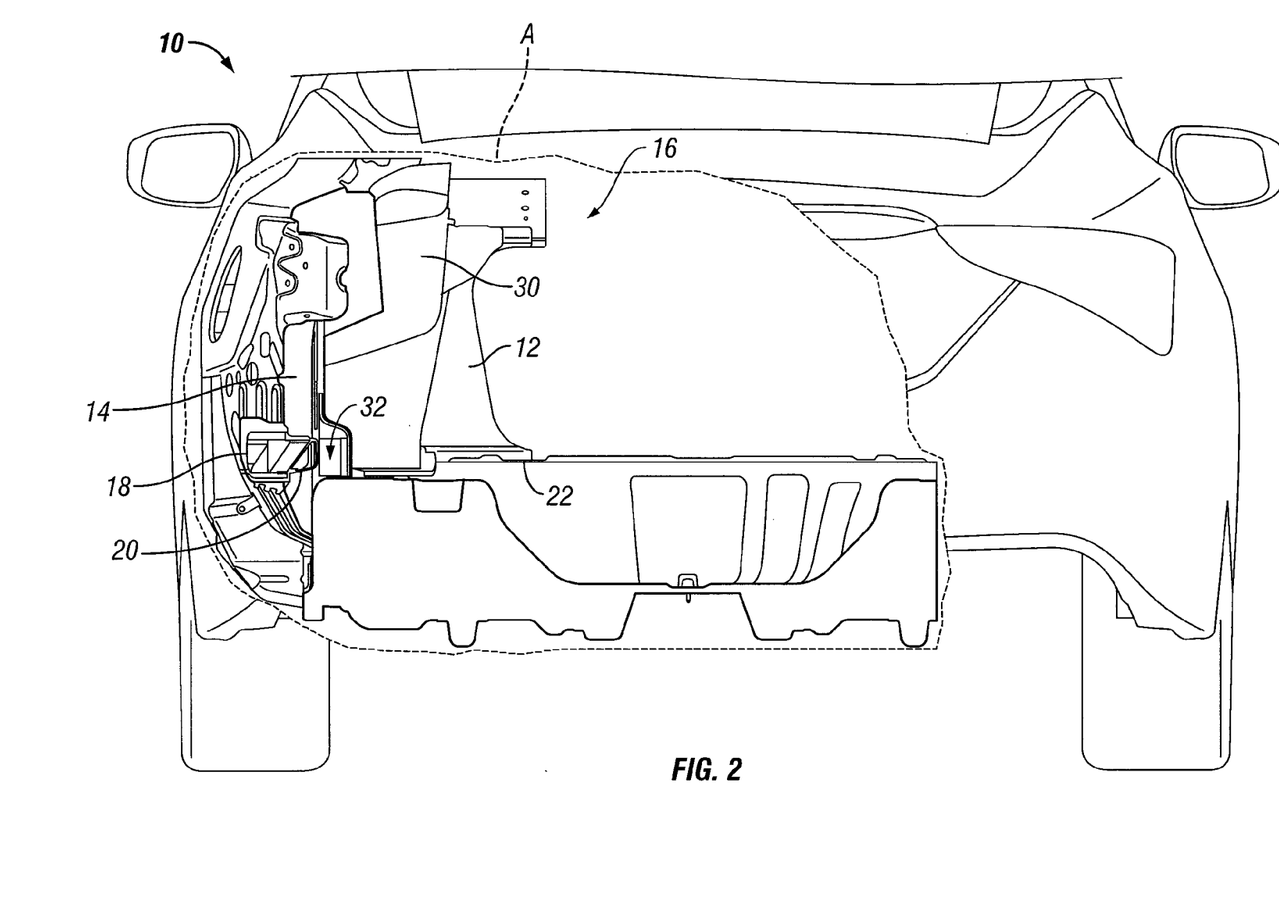
FIG. 2 is a rear view of the vehicle with a portion of the rear of the vehicle being cut away to expose an interior of the trunk storage compartment.

FIGS. 1 and 2 illustrate a vehicle 10 including a reinforced vehicle trim assembly 12 according to the embodiments disclosed herein. As illustrated, the rear portion A of the vehicle 10 is cut away to expose a portion of the vehicle frame 14 that forms the exterior of the trunk storage compartment 16 of the vehicle 10. In this example, the vehicle 10 is shown as a passenger vehicle. However, the features of the reinforced vehicle trim assembly 12 discussed herein are applicable to a reinforced vehicle trim assembly 12 that is located in a storage compartment of any type of vehicle such as a truck, van, SUV, bus, and so on. Moreover, these features of the reinforced vehicle trim assembly 12 are applicable to a configuration of a reinforced vehicle trim assembly 12 that might not be disposed in a vehicle storage compartment, but rather, can be disposed at any location in the vehicle at which the reinforced vehicle trim assembly 12 can be susceptible to loading forces.

In this example, the reinforced vehicle trim assembly 12 is positioned at the side of the interior of the trunk storage compartment 16 to cover a drafter 18 having a drafter cap 20. That is, as understood in the art, due to the body styling and configuration of the rear of the vehicle 10, it is possible for a pressure release valve (PRV), which can be referred to as a drafter, to be positioned above the portion of the metal vehicle frame 14 that makes up the metal floor 22 of the trunk storage compartment 16. It is also understood in the art that the trunk storage compartment 16 is at least partially exposed to the exterior of the vehicle 10 through the drafter 18, which can be undesirable for second row noise isolation, especially at high speeds. Therefore, the drafter cap 20 is placed over the drafter to improve the noise, vibration and harshness (NVH) performance of the vehicle 10. The drafter cap 20 is typically formed by injection molding and is very thin.

However, because the drafter 18 is positioned above the metal floor 22 of the trunk storage compartment 16, the drafter 18 and especially the drafter cap 20 protrude into the trunk storage compartment 16. Therefore, there is a risk that the drafter cap 20 can become damaged due to contact by, for example, a trim assembly that covers the side of the trunk storage compartment 16 into which the drafter 18 and drafter cap 20 protrude. Displacement of such a trim assembly can occur in a variety of ways including while loading or transporting luggage or other cargo. One solution could be to, for example, hot melt a brace made of thermal formed plastic, steel, or any other suitable material behind the trim assembly to protect the drafter 18 and the drafter cap 20. However, as will now be explained, the reinforced vehicle trim assembly 12 according to the disclosed embodiments is configured to protect the drafter 18 and drafter cap 20 while providing a desirable appearance.

Figure 3:
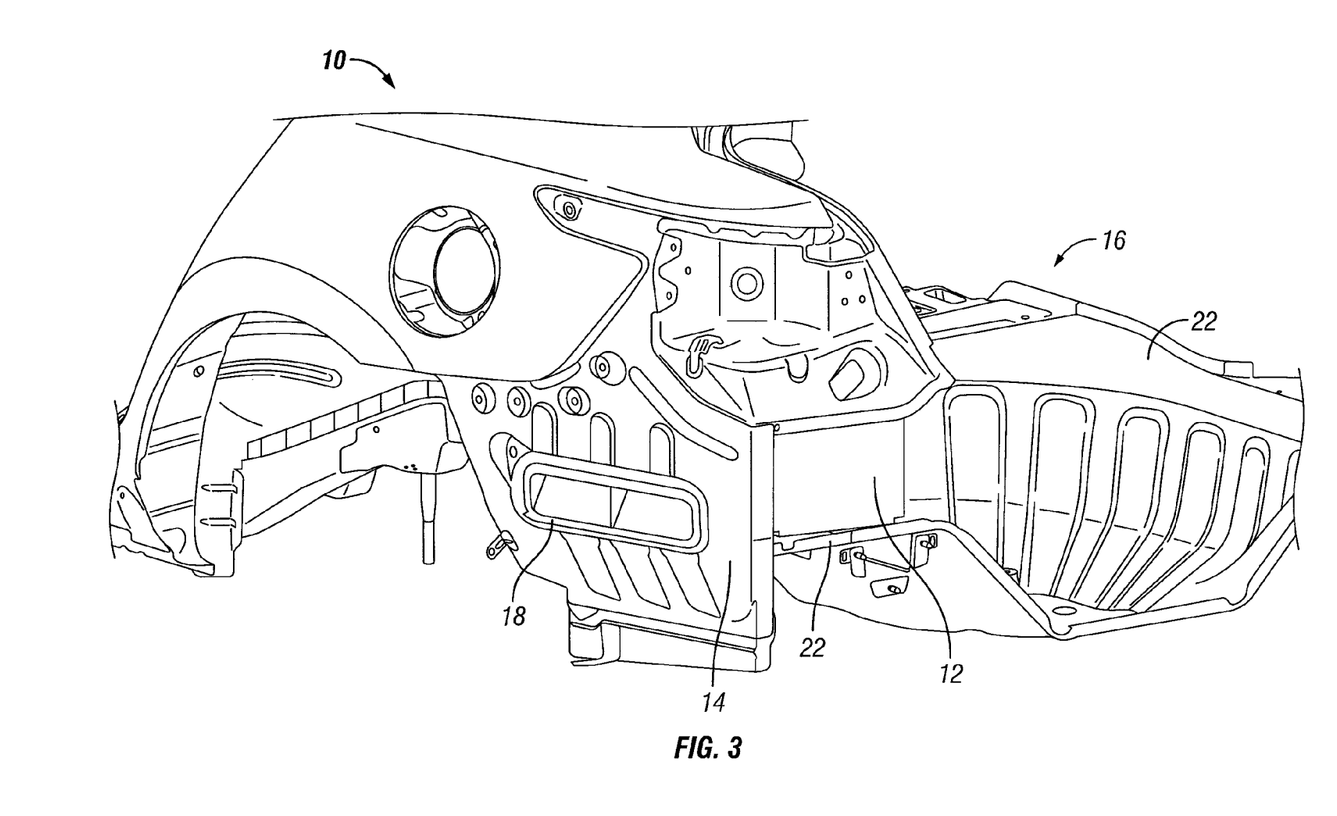
FIG. 3 is a partial perspective view of the rear portion of the trunk storage compartment as shown in FIGS. 1 and 2.
Figure 4:
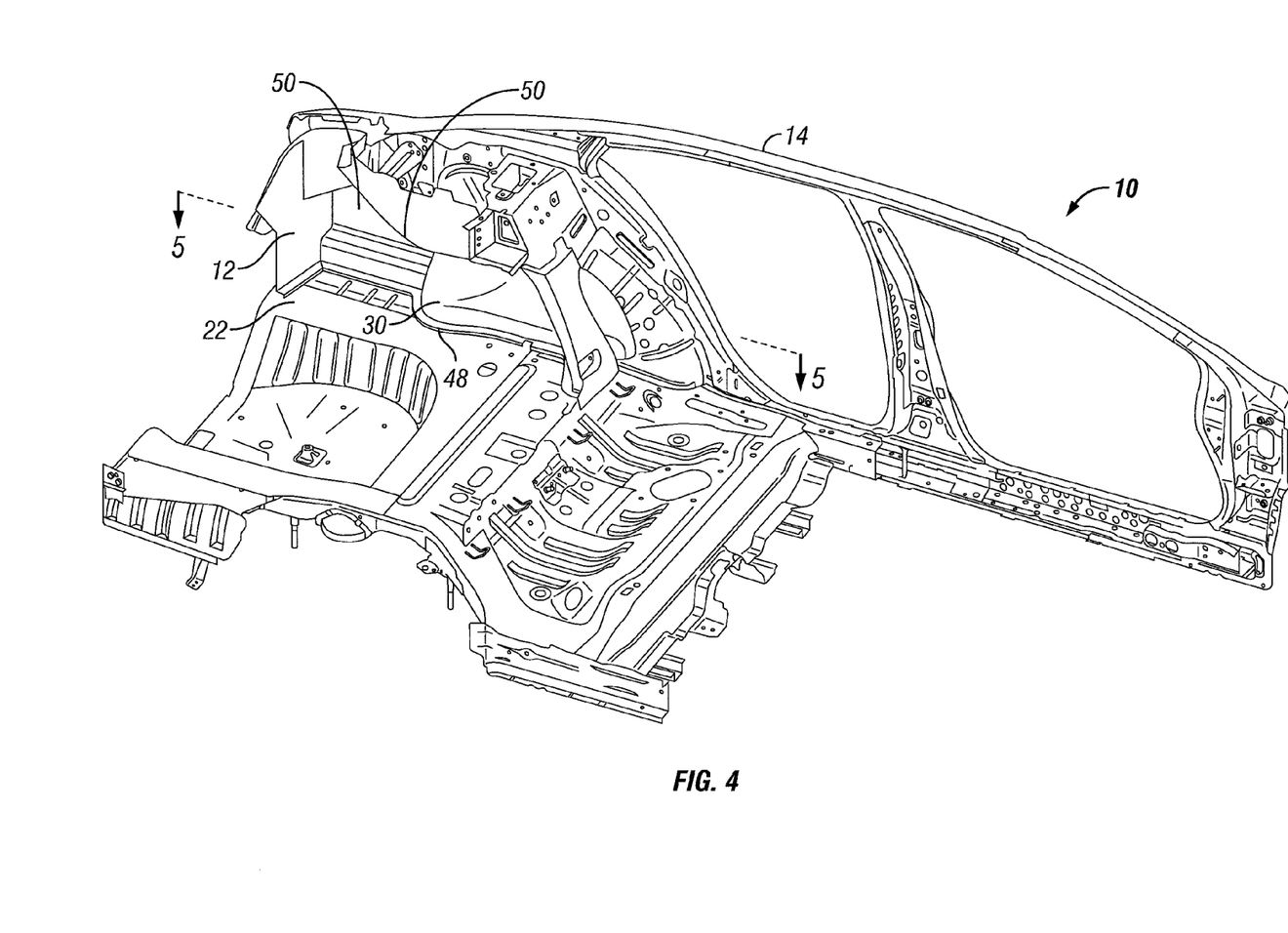
FIG. 4 is a partial perspective view of the left hand side portion of the vehicle frame illustrating an example of the reinforced vehicle trim assembly disposed in the trunk storage compartment.
Figure 5:
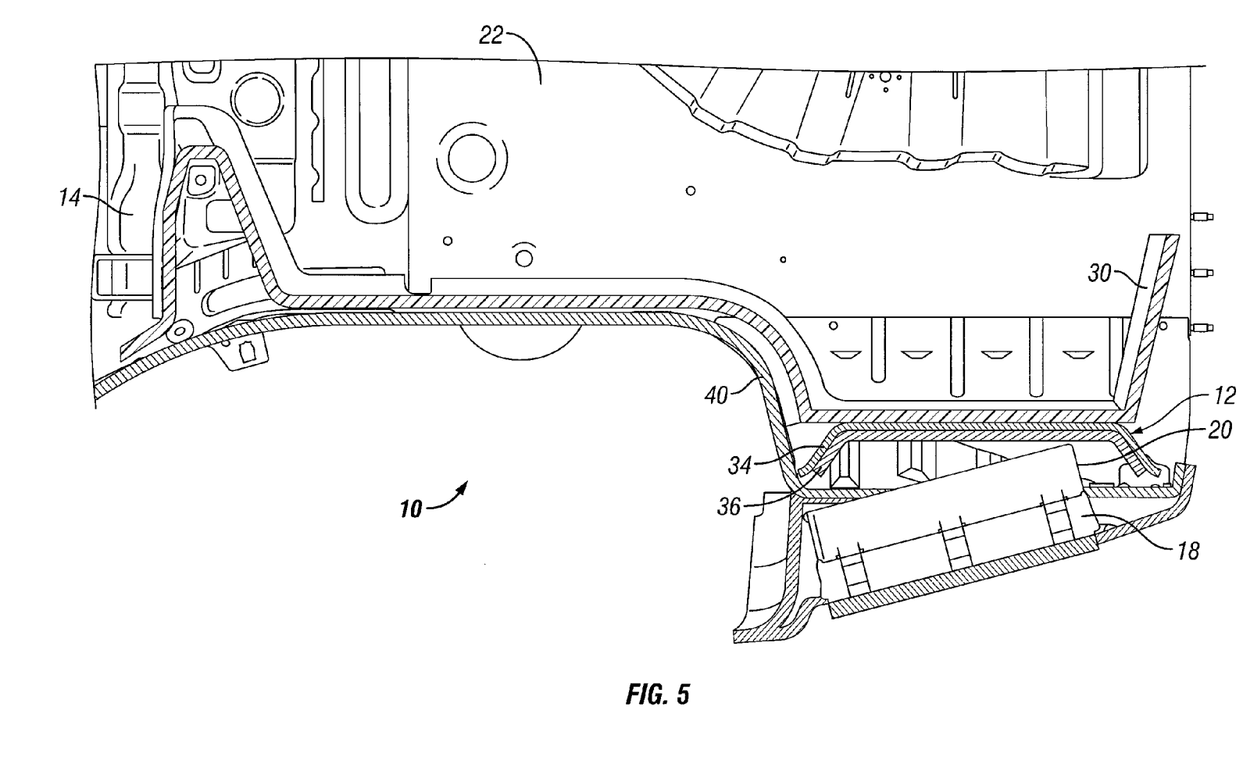
FIG. 5 is a cross-sectional view taken along lines 5-5 in FIG. 4 showing a cross-section of the lower portion of the reinforced vehicle trim assembly.
Figure 6:
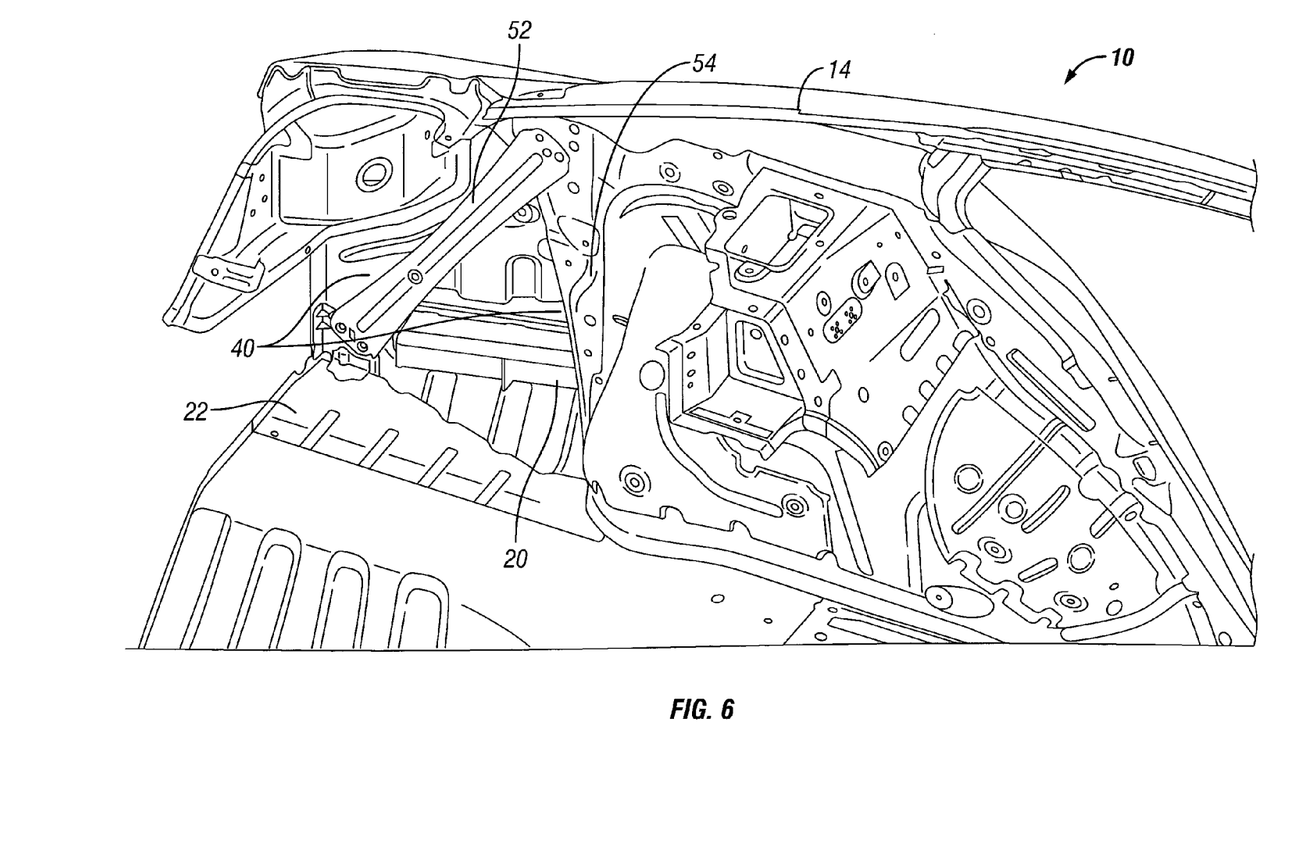
FIG. 6 is a partial interior perspective view of the portion of the vehicle frame in the trunk storage compartment with the reinforced vehicle trim assembly removed.
Figure 7:
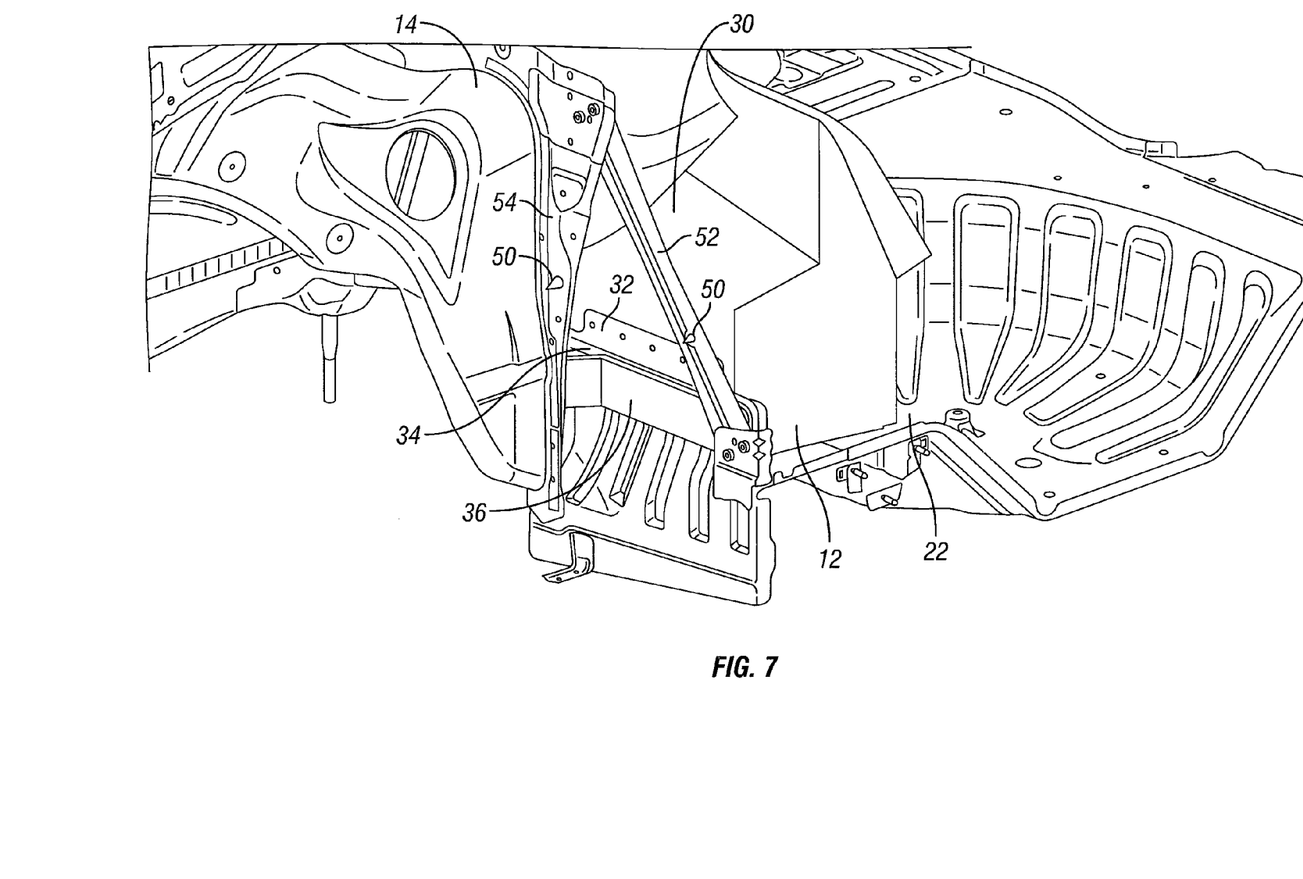
FIG. 7 is a partial exterior perspective view looking towards the trunk storage compartment with a portion of the vehicle frame removed.
Figure 8:
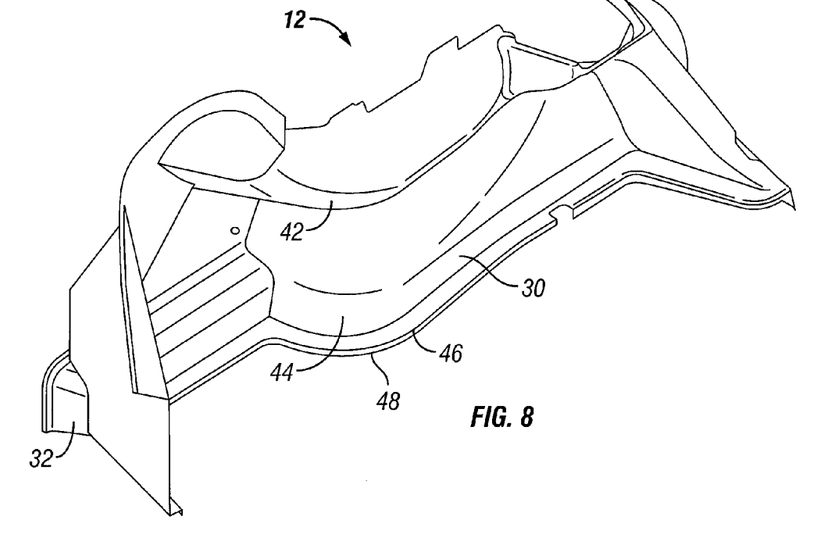
FIG. 8 is a perspective view of the reinforced vehicle trim assembly showing the exposed surface of the reinforced vehicle trim assembly that faces the trunk storage compartment as viewed from the rear of the trunk storage compartment.
Figure 9:
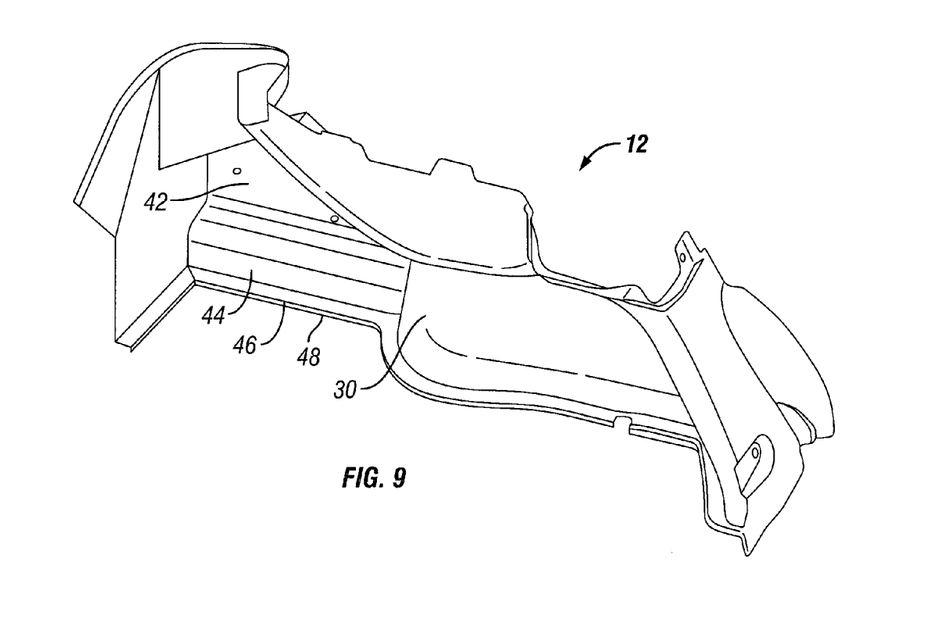
FIG. 9 is another perspective view of the reinforced vehicle trim assembly showing the exposed surface as viewed from the front of the trunk storage compartment.
Figure 10:
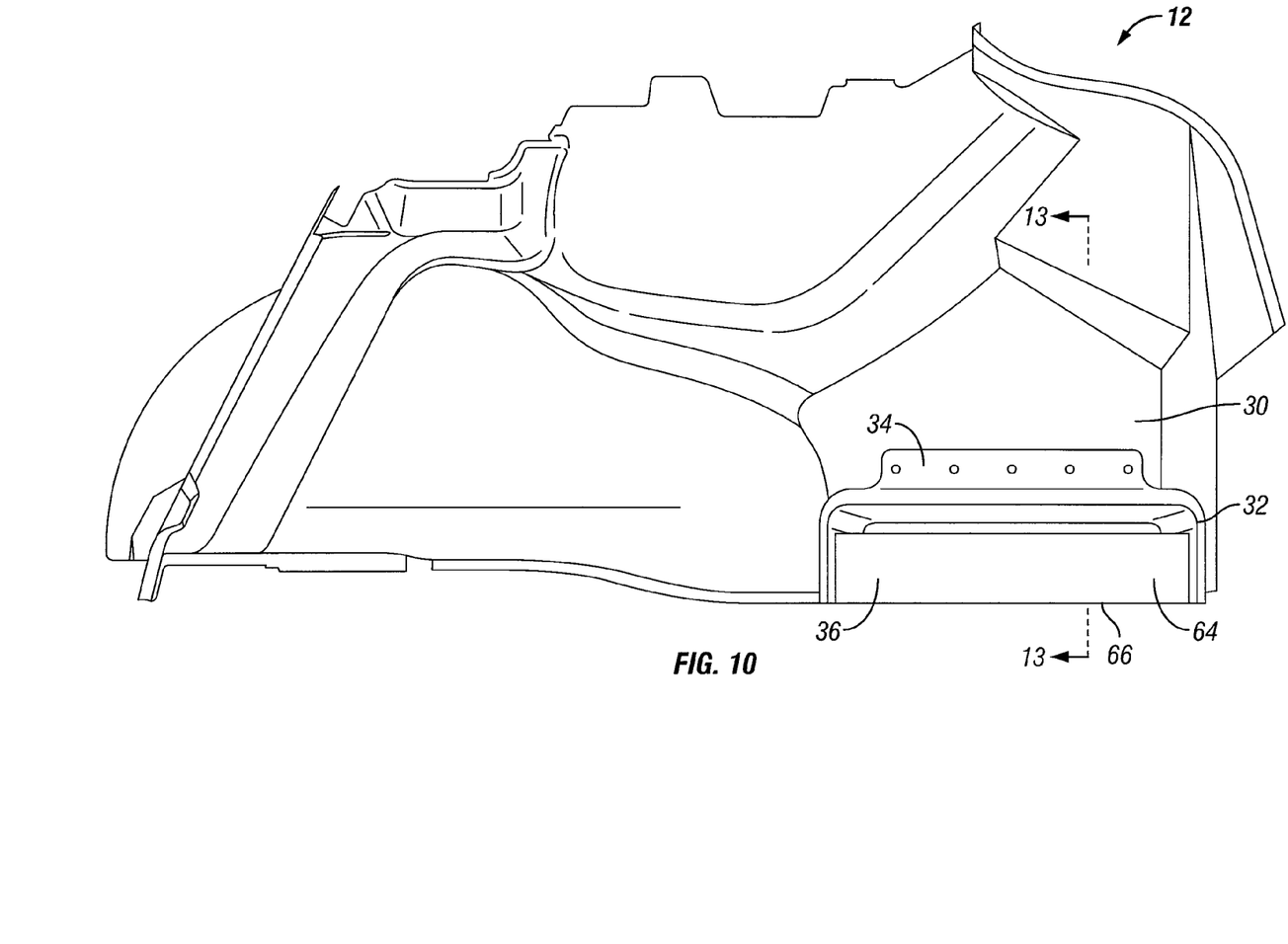
FIG. 10 is an elevational view of the hidden surface of the reinforced vehicle trim assembly showing the trim panel and the reinforcement member.

As shown, for example, in FIGS. 2 and 3, in this example, the reinforced vehicle trim assembly 12 covers the drafter 18 and the drafter cap 20. It should be noted that for exemplary purposes, only the reinforced vehicle trim assembly 12, drafter 18 and drafter cap 20 present at the left hand side (or driver's side) of the vehicle 10 are illustrated and described. However, a reinforced vehicle trim assembly 12, drafter 18 and drafter cap 20 can additionally or instead be present at the right hand side (or front passenger side) of the vehicle 10, and could thus be a mirror image configuration relative to the corresponding components at the left hand side of the vehicle 10.

As shown in FIGS. 2 through 7, and in more detail in FIGS. 8 through 12, the reinforced vehicle trim assembly 12 includes a trim panel 30 and a reinforcement member 32. The trim panel 30 can be made of, for example, plastic or any other suitable material. In this example, the trim panel 30 can be made of polyethylene terephthalate (PET) fiber having a thickness of at least, for example, 2.5 mm with a loading capacity of 1100 g/m$^2$ as understood in the art. Naturally, the trim panel 30 can be made of any suitable material and can have any suitable thickness and loading capacity.

Figure 11:
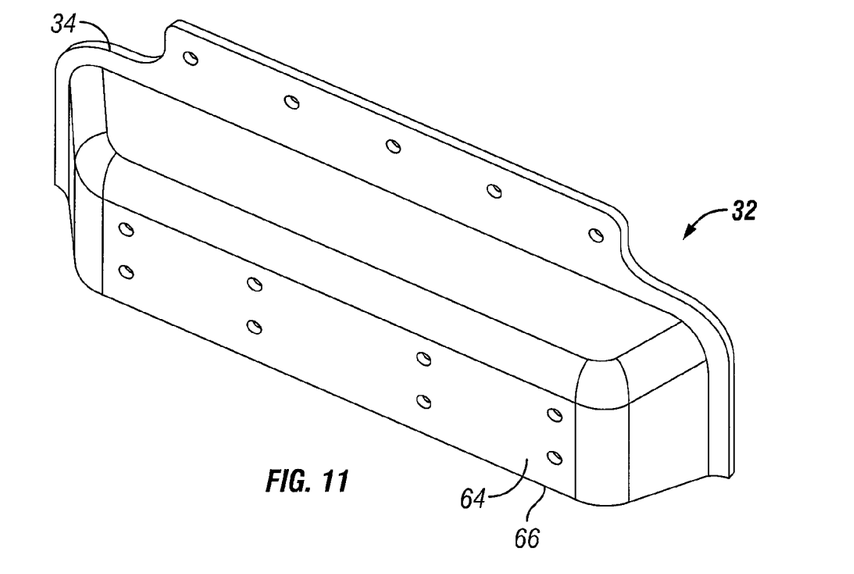
FIG. 11 is a perspective view of the front surface of the reinforcement member that faces the hidden surface of the trim panel of the reinforced vehicle trim assembly when the reinforcement member is coupled to the trim panel.
Figure 12:
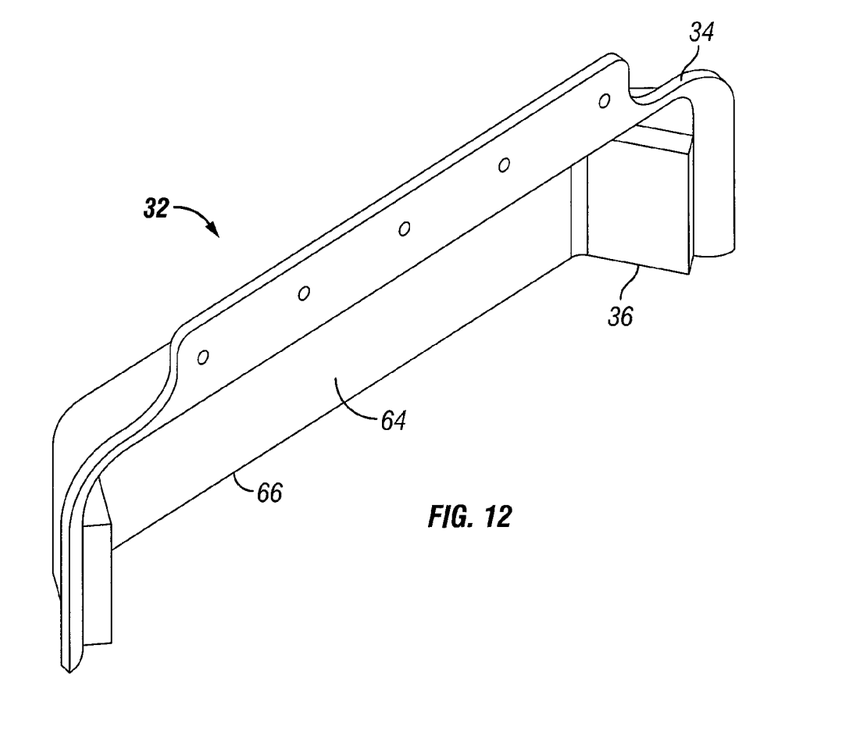
FIG. 12 is a perspective view of the rear surface of the reinforcement member that faces the vehicle frame when the reinforcement member is coupled to the trim panel.

The reinforcement member 32 can be made of a more rigid material such as steel, composites, hard plastic and the like, and can be thicker than the trim panel 30. Also, as shown in FIGS. 11 and 12, the reinforcement member 32 can be a multi-piece component including, for example, a first reinforcement component 34 and a second reinforcement component 36 that can be made of the same or similar materials. Alternatively, the second reinforcement component 36 can be an insulator or cushion made out of any suitable material as understood in the art. The first and second reinforcement components 34 and 36 can be secured together by gluing, molding, fasteners such as screws or rivets, or in any suitable manner.

As can be appreciated from FIGS. 2 through 9, the trim panel 30 is mounted to at least one vehicle body member 40 inside the vehicle trunk storage compartment 16. In this example, the trim panel 30 includes a trim panel base portion 42, a trim panel middle portion 44 and a trim panel free end portion 46 which includes a trim panel free edge 48. The trim panel base portion 42 is mounted to the vehicle body member 40 by, for example, fasteners 50 such as snap-fit clips or any other suitable types of fasteners. In this example, the vehicle body member 40 includes a crossbar 52 and a frame portion 54 to which the trim panel base portion 42 is secured by the fasteners 50. However, the trim panel base portion 42 can be secured to the vehicle 10 in any suitable manner.

Figure 13:
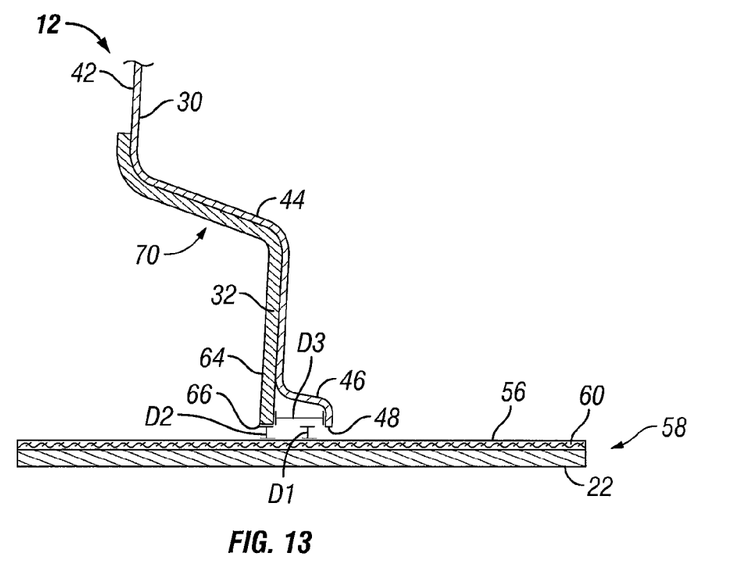
FIG. 13 is a diagrammatic cross-sectional view illustrating an example of the positions of the trim panel free edge and the reinforcement member free edge while the reinforced vehicle trim assembly is disposed in the trunk storage compartment without any loading force being applied to the reinforced vehicle trim assembly.
Figure 14:
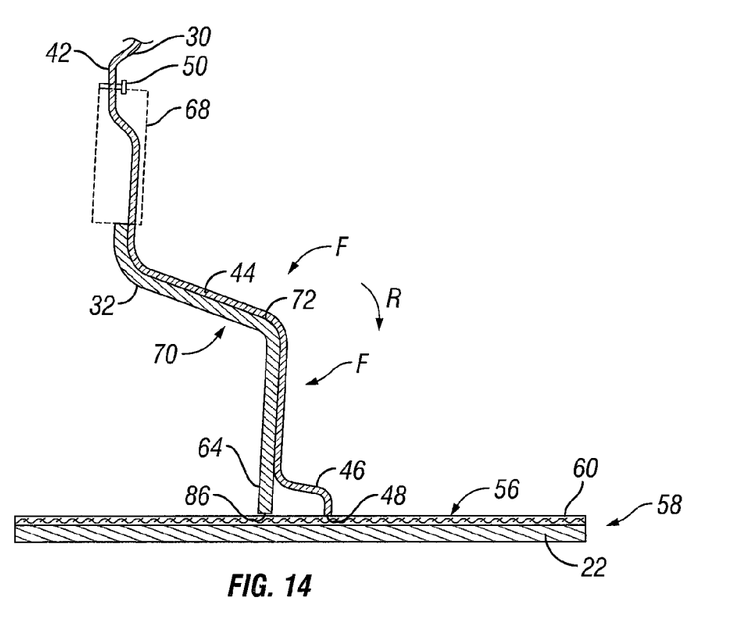
FIG. 14 is a diagrammatic cross-sectional view illustrating an example of the manner in which the reinforced vehicle trim assembly flexes and moves about a pivot area toward the floor panel of the trunk storage compartment when a loading force is applied to the reinforced vehicle trim assembly.
Figure 15:
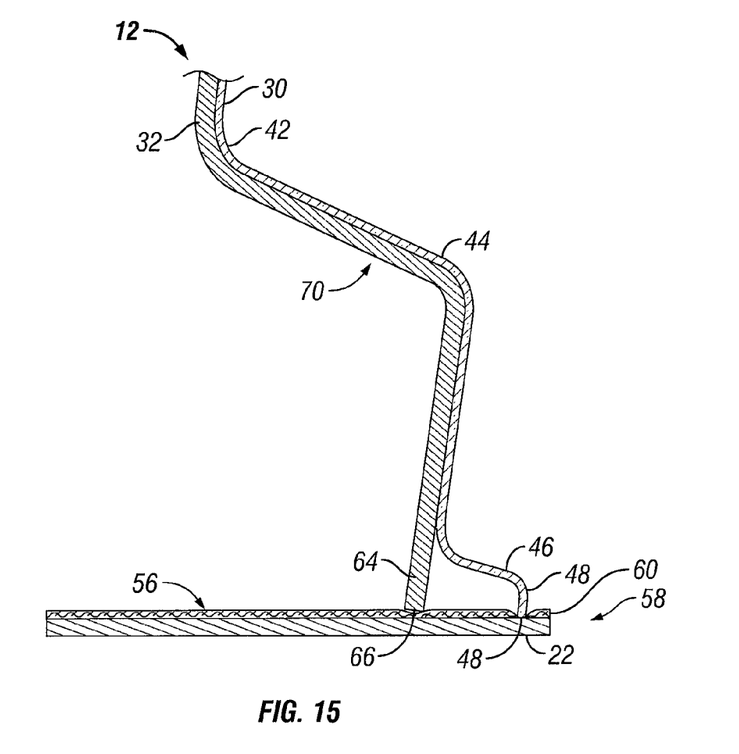
FIG. 15 is a diagrammatic cross-sectional view illustrating an example of the manner in which the trim panel free edge and the reinforcement member free edge contact the floor panel of the trunk storage compartment while the loading force is being applied to the reinforced vehicle trim assembly.

As further shown diagrammatically in FIGS. 13 through 15, the trim panel free edge 48 extends cantilevered toward a surface 56 of a vehicle body panel 58 that faces inside the vehicle trunk storage compartment 16. As discussed above, the vehicle body panel 58 is configured as a floor panel of the trunk storage compartment 16. In this example, the vehicle body panel 58 includes a rigid panel, which can be the metal floor 22 of the trunk storage compartment 16, and a trim member 60 such as a carpet attached to the metal floor 22. The trim panel free edge 48 is spaced at a first distance D1 from the surface 56 of the vehicle body panel 58. In this example, the surface 56 can be the exposed surface of the trim member 60 (e.g., carpet) and defines the bottom inside surface of the vehicle trunk storage compartment 16.

The reinforcement member 32 is also mounted in the vehicle trunk storage compartment 16 proximate to the trim panel 30 between the trim panel 30 and the vehicle body member 40. As shown, for example, in FIG. 10 the reinforcement member 32 can be attached to the trim panel 30 by rivets, screws, hook and loop fasteners or any other suitable types of fasteners, or can be secured to the trim panel 30 by any suitable type of adhesive such as glue, tape or hot melting as understood in the art. Thus, a portion of the reinforcement member 32 contacts a portion of the trim panel 30. Alternatively, the trim panel 30 and the reinforcement member 30 can be molded together with the reinforcement member 30 having a more rigid structure than the trim panel 30.

As further shown, the reinforcement member 32 has a reinforcement member free end portion 64 that includes a reinforcement member free edge 66 that extends cantilevered toward the surface 56 of the vehicle body panel 58 and is spaced at a second distance D2 from the surface 56 of the vehicle body panel 58. Distances D1 and D2 can be, for example, at or about 5 mm or any other suitable distance. The first and second distances D1 and D2 can be the same or substantially the same. Alternatively, D1 can be larger than D2 or vice-versa, depending, for example, on the configuration of the vehicle body panel 58.

Furthermore, the trim panel free end portion 46 and the reinforcement member free end portion 64 are spaced from each other at a distance D3 taken in a direction moving away from the vehicle body member 40 parallel or substantially parallel to the surface 56 of the vehicle body panel 58. Distance D3 can be, for example, within a range of at or about 10 mm to at or about 30 mm, with an exemplary value of at or about 20 mm. However, distance D3 can be any suitable distance, and the size of distance D3 can be set based on the sizes of distances D1 and D2 and vice-versa.

Thus, the trim panel free end portion 46 and the reinforcement member free end portion 64 are spaced inboard relative to the trim panel base portion 42. Also, the trim panel free end portion 46 and the reinforcement member free end portion 64 can extend parallel or substantially parallel to each other. Furthermore, either or both of the trim panel free end portion 46 and the reinforcement member free end portion 64 extends perpendicular or substantially perpendicular to the surface 56 of the vehicle body panel 58. The reinforcement member free end portion 64 is, also positioned proximate to the drafter cap 20 to cover at least a portion of the drafter cap 20. For instance, the reinforcement free end portion 64 can be at a distance of 15 mm or any other suitable distance from the drafter cap 20.

The trim panel 30 and the reinforcement member 32 are configured to deflect in response to a force F applied to the trim panel 30 such that the trim panel free edge 48 and the reinforcement member free edge 66 move toward the surface 56 of the vehicle body panel 58. In this example, the trim panel 30 includes a pivot area 68 about which the trim panel 30 pivots while deflecting in response to the force F. The pivot area 68 can be located at the trim panel middle portion 44 in the area of one of the fasteners 50 or at any other suitable location along the trim panel 30. As also shown, the trim panel middle portion 44 in this example includes a stepped portion 70 from which the trim panel free end portion 48 extends and is rotatable about the pivot area 68. The pivot area 68 can be at or just above the stepped portion 70. Furthermore, the trim panel middle portion 48 can include an elbow portion 72 from which the trim panel free end portion 48 extends as shown.

As can be appreciated from FIGS. 13 through 15, while the force F is applied to the trim panel 30, the trim panel 30 and the reinforcement member 32 deflect in a rotational direction R about the pivot area 68 in response to the force F such that the trim panel free edge 48 and the reinforcement member free edge 66 contact the surface 56 of the vehicle body panel 58 without the reinforcement member 32 contacting the drafter cap 20. In this example, the trim panel 30 and the reinforcement member 32 are configured to deflect in response to the force F such that the trim panel free edge 48 contacts the surface 56 of the vehicle body panel 58 before the reinforcement member free edge 66 contacts the surface 56 of the vehicle body panel 58. However, the trim panel 30 and the reinforcement member 32 can be configured so that the trim panel free edge 48 and the reinforcement member free edge 66 contact the surface 56 simultaneously or substantially simultaneously, or the reinforcement member free edge 66 contacts the surface 56 first or without the trim panel free edge 48 contacting the surface 56. Accordingly, the reinforced trim panel assembly 12 protects the drafter 18 and drafter cap 20 while preserving interior fit-and-finish.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the reinforced vehicle trim assembly described herein. Accordingly, these terms, as utilized to describe the present invention should be interpreted relative to a vehicle equipped with the reinforced vehicle trim assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A reinforced vehicle trim assembly comprising:
   a trim panel mounted to a vehicle body member inside a vehicle storage compartment such that a trim panel free edge extends cantilevered toward a surface of a vehicle body panel that faces inside the vehicle storage compartment, the trim panel free edge being spaced at a first distance from the surface of the vehicle body panel; and
   a reinforcement member mounted in the vehicle storage compartment proximate to the trim panel between the trim panel and the vehicle body member, the reinforcement member having a reinforcement member free edge that extends cantilevered toward the surface of the vehicle body panel and is spaced at a second distance from the surface of the vehicle body panel, the trim panel and the reinforcement member being configured to deflect in response to a force applied to the trim panel such that the trim panel free edge and the reinforcement member free edge move toward the surface of the vehicle body panel.

2. The reinforced vehicle trim assembly according to claim 1, wherein the trim panel includes a pivot area about which the trim panel pivots while deflecting in response to the force.

3. The reinforced vehicle trim assembly according to claim 2, wherein
the trim panel includes a stepped portion and a base portion, the stepped portion including the trim panel free edge that is rotatable about the pivot area.

4. The reinforced vehicle trim assembly according to claim 1, wherein
a portion of the reinforcement member contacts a portion of the trim panel.

5. The reinforced vehicle trim assembly according to claim 4, wherein
the trim panel comprises a trim panel free end portion which includes the trim panel free edge and the reinforcement member comprises a reinforcement member free end portion which includes the reinforcement member free edge, the trim panel free end portion and the reinforcement member free end portion being spaced from each other in a direction moving away from the vehicle body member parallel to the surface of a vehicle body panel.

6. The reinforced vehicle trim assembly according to claim 5, wherein
the trim panel free end portion extends from an elbow in the trim panel.

7. The reinforced vehicle trim assembly according to claim 5, wherein
the trim panel free end portion and the reinforcement member free end portion extend substantially parallel to each other.

8. The reinforced vehicle trim assembly according to claim 5, wherein
at least one of the trim panel free end portion and the reinforcement member free end portion extends substantially perpendicular to the surface of the vehicle body panel.

9. The reinforced vehicle trim assembly according to claim 1, wherein
the first and second distances are substantially the same.

10. The reinforced vehicle trim assembly according to claim 1, wherein
a portion of the reinforcement member is secured to a portion of the trim panel.

11. The reinforced vehicle trim assembly according to claim 10, wherein
the portion of the reinforcement member is secured to the portion of the trim panel by at least one of an adhesive, a fastener and hot melting the portions together.

12. The reinforced vehicle trim assembly according to claim 1, wherein
the trim panel includes one of plastic and composites; and
the reinforcement member includes one of metal, plastic and composites.

13. The reinforced vehicle trim assembly according to claim 1, wherein
the vehicle storage compartment is a vehicle trunk compartment, the surface of the vehicle body panel defining a bottom inside surface of the vehicle trunk compartment, and the trim panel and reinforcement member are disposed inside the vehicle trunk compartment proximate to a side of the vehicle trunk compartment.

14. The reinforced vehicle trim assembly according to claim 1, wherein
the vehicle storage compartment is a vehicle trunk compartment, and the trim panel and the reinforcement member are disposed inside the vehicle trunk compartment to cover a drafter cap that extends into the vehicle trunk compartment.

15. The reinforced vehicle trim assembly according to claim 14, wherein
the reinforcement member comprises a reinforcement member free end portion which includes the reinforcement member free edge, the reinforcement member free end portion being positioned proximate to the drafter cap to cover at least a portion of the drafter cap.

16. The reinforced vehicle trim assembly according to claim 15, wherein
the trim panel and the reinforcement member are configured to deflect in response to the force such that the trim panel free edge and the reinforcement member free edge contact the surface of the vehicle body panel without the reinforcement member contacting the drafter cap.

17. The reinforced vehicle trim assembly according to claim 1, wherein
the trim panel and the reinforcement member are configured to deflect in response to the force such that the trim panel free edge contacts the surface of the vehicle body panel before the reinforcement member free edge contacts the surface of the vehicle body panel.

18. The reinforced vehicle trim assembly according to claim 1, wherein
the trim panel further includes a base portion that is fixed to the vehicle body member, the trim panel free edge and the reinforcement member free edge being spaced inboard relative to the base portion.

19. The reinforced vehicle trim assembly according to claim 18, wherein
the trim panel includes a pivot area about which the trim panel pivots while deflecting in response to the force, with the pivot area being situated proximate to a mounting structure that fixes the base portion to the vehicle body member.

20. The reinforced vehicle trim assembly according to claim 1, wherein
the vehicle body panel includes a rigid panel and a carpet attached to the rigid panel, an exposed surface of the carpet including the surface of the vehicle body panel from which the trim panel free edge and the reinforcement member free edge are spaced at the first distance and the second distance, respectively.

* * * * *